Aug. 15, 1950

P. D. EXNER 2,518,766

ANTIGLARE DEVICE

Filed May 11, 1949

INVENTOR.
Peter Daniel Exner

BY Alex. E. MacRae

Attorney.

Patented Aug. 15, 1950

2,518,766

UNITED STATES PATENT OFFICE 2,518,766

ANTIGLARE DEVICE

Peter Daniel Exner, Regina, Saskatchewan, Canada

Application May 11, 1949, Serial No. 92,587
In Canada April 25, 1949

3 Claims. (Cl. 248—278)

1

The present invention relates to an improved sun visor mechanism for use in vehicles such as automobiles or the like.

Sun visors as normally employed in automobiles are attached to the vehicle in such a way that adequate protection is only provided directly in front of or directly to the side of the vehicle operator, although it is apparent that light rays may enter the vehicle from many other unprotected directions. While attempts have been made to provide a sun visor which would serve to shield the operator from rays arriving from any direction, such attempts have not resulted in a commercially feasible device due largely to their complicated and costly nature.

An object of the present invention is to provide a sun visor mechanism of simple inexpensive construction for use in the interior of the automobile or like vehicle wherein the visor blade is so supported as to be easily and readily adjustable to any required position to shield the operator's eyes from light rays entering the vehicle from substantially all directions, thus eliminating the hazards of glare in vehicle operation.

Figure 1:
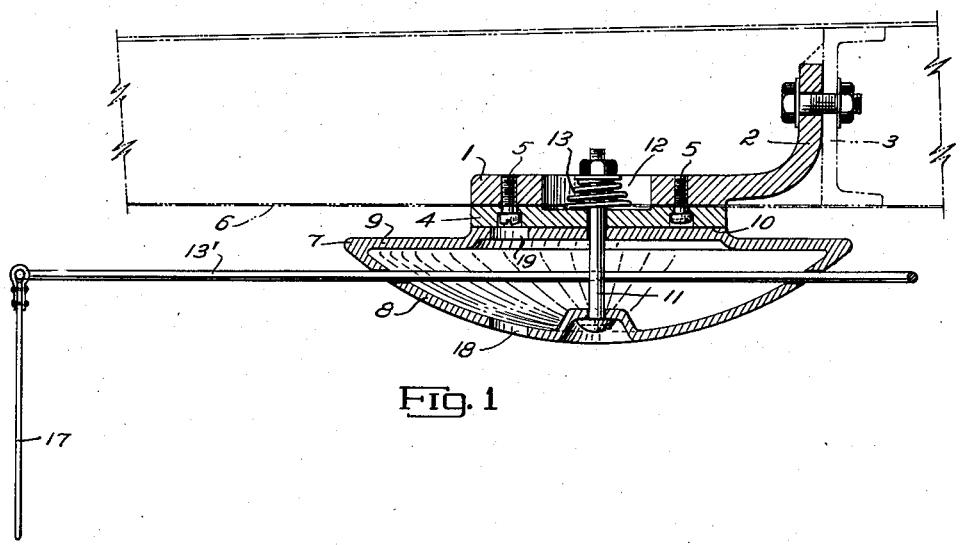
Figure 2:
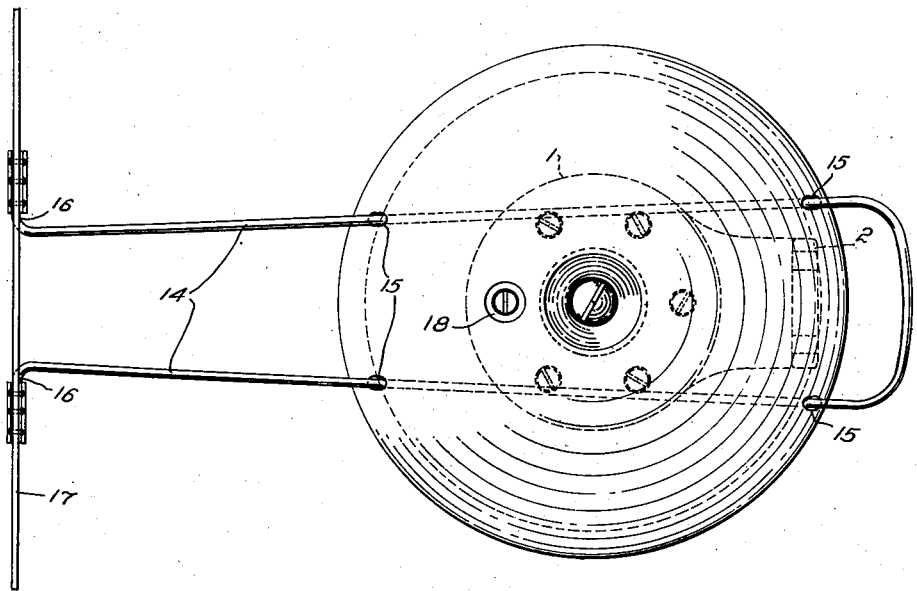

The invention will be described with reference to the accompaning drawings, in which Figure 1 is a side elevation, partly in section, of a visor assembly in accordance with the invention, and Figure 2 is a plan view.

Referring to the drawing, 1 is a base plate adapted to be mounted in horizontal relation in a vehicle directly above the operator's head, as by means of a bracket 2 bolted to a cross rib 3 of the vehicle roof. A disc 4 is fixed to the underside of the base 1 as by means of screws 5, the lower surface of the disc 4 being disposed below the roof surface 6. A visor arm supporting bracket or member 7 comprises a hollow circular member having a convex lower wall 8 and a flat upper wall 9. The member 7 is of considerably larger diameter than that of disc 4 and is preferably double the diameter of disc 4. A raised axial portion 10 of the upper surface 9 is arranged to engage the lower surface of disc 4 and may be of substantially the same diameter as disc 4. The member 7 is resiliently held in engagement with disc 4 and rotatably mounted thereon by means of an axial bolt 11 extending through the member, disc 4 and base 1, which has an axial recess 12 to accommodate the spring 13.

A visor arm 13' comprises a U-shaped rod of spring steel or the like having its legs 14 extending through respective pairs of aligned openings

2

15 in the convex portion 8 of member 7, such legs converging slightly towards each other as clearly shown in Figure 2. The free ends of legs 14 are reversely bent into aligned relation as indicated at 16, and the usual visor 17 is pivoted thereto in depending relation therefrom.

Aligned service openings 18 and 19 may be provided in member 7 to provide access to the screws 5 for assembly or disassembly purposes.

It will be apparent that, by pressing the legs 14 slightly towards each other, the effective length of the visor arm may be adjusted as desired by sliding the legs 14 through the openings 15. It will also be apparent that the horizontal position of the visor is adjustable throughout a complete 360° around the operator's head, thus providing a visor which is effective against light rays from all directions.

The diameter of the disc 4 and the engaging surface 10 is preferably at least four inches to provide a stable support for the visor arm and to avoid vibration thereof. The U-shaped visor arm, in combination with the convex supporting member therefor, provides an effective support for the visor while making possible a very simple and rapid means for adjusting the position of the visor with respect to the operator.

There has thus been provided a simple and inexpensive visor mechanism which may be readily mounted on a vehicle and which provides substantially greater protection against the hazards of glare than visors heretofore proposed.

I claim:

1. A sun visor mechanism comprising, a base, a plate mounted on said base, a clamping bracket pivotally mounted on said plate for rotatable adjustment about an axis perpendicular to the plane of the base, a U-shaped visor arm having its legs slidably mounted in said bracket, said bracket having portions slidably engaging and holding said legs in converging relation towards their free ends to maintain said legs under tension, and a visor blade hingedly attached to said visor arm.

2. A sun visor or anti-glare device comprising a clamping bracket, means for rotatably mounting the clamping bracket in the top of a motor vehicle or the like, a resilient U-shaped visor arm having its legs slidably mounted in said bracket, said bracket having portions slidably engaging and holding said legs in converging relation towards their free ends to maintain said legs under tension and to permit extending or retracting said arm, and a visor blade hingedly mounted on the outer end of said arm.

3. An anti-glare device for vehicles comprising a base plate having an axial recess therein, a second plate fixed to and overlying the first plate, a bracket comprising a hollow circular member having a convex lower wall and a flat upper wall, means for rotatably mounting said bracket on the second plate with said upper wall in resilient frictional engagement with the second plate comprising a bolt extending axially through the bracket and second plate and a spring carried by the bolt and seated in said recess, a visor arm consisting of a U-shaped rod having its legs slidably mounted in said convex wall in substantially right angular relation to said bolt, said legs converging towards their free ends, and a visor pivotally suspended from the free ends of said legs.

PETER DANIEL EXNER.

REFERENCES CITED

The following references are of record in the file of this patent:

UNITED STATES PATENTS

| Number | Name | Date |
| --- | --- | --- |
| 2,235,421 | Devine | Mar. 8, 1941 |
| 2,454,613 | Peltier et al. | Nov. 23, 1948 |